United States Patent
Passino et al.

[15] 3,637,480
[45] Jan. 25, 1972

[54] ELECTRODIALYSIS PROCESS THROUGH SUPPLY WATER PRETREATMENT ON ION-EXCHANGE RESINS

[72] Inventors: Roberto Passino, Via F Ferrara 8 00191, Roma; Gianfranco Boari, Via S. Lioco Polar H. 70124, Bari, both of Italy

[22] Filed: Nov. 18, 1968

[21] Appl. No.: 776,821

[30] Foreign Application Priority Data

Nov. 18, 1967 Italy ................................. 40817 A/67

[52] U.S. Cl. ........................................................ 204/180 P
[51] Int. Cl. ................................... B01d 13/02, C02b 1/82
[58] Field of Search ........................... 204/180 P, 180 F, 301

[56] References Cited

UNITED STATES PATENTS

| 2,502,614 | 4/1950 | Zender | 210/8.5 |
|---|---|---|---|
| 2,794,777 | 6/1957 | Pearson | 204/151 |
| 3,056,651 | 10/1962 | McIlhenny et al. | 23/91 |
| 3,063,924 | 11/1962 | Gomella | 204/180 |

OTHER PUBLICATIONS

Wilson, " Deminevalization by Electrodialysis," pp. 230– 234 1960, TD433P7C.2

Dow Chem. Co., " Dowex:: Ion Exchange," 1958, p. 23

Primary Examiner—John H. Mack
Assistant Examiner—A. C. Prescott
Attorney—Newton, Hopkins & Ormsby

[57] ABSTRACT

A process for the desalination of salt water employing separate sodium and hydrogen form cation exchange resins to soften, to dealkalize and to partially deionize the said water prior to substantial demineralization by electrodialysis. The salt-concentrated waste stream from the electrodialysis cell may be employed to regenerate the sodium-form exchange resin that becomes exhausted during the softening step.

5 Claims, No Drawings

ELECTRODIALYSIS PROCESS THROUGH SUPPLY WATER PRETREATMENT ON ION-EXCHANGE RESINS

As well known, water desalting by electrodialysis occurs by ion removal through selective ion-exchange membranes under the effect of an electric field.

It is also known that in an electrodialysis unit the separation energy required is much larger (say from 10 to 20 times) than minimum theoretical energy, said energy being inversely proportional to current efficiency and directly proportional to desalting degree, unit resistance and current density.

1. Current efficiency, that is the ratio of theoretical current intensity as given by Faraday's law and actual current intensity, is affected by the following factors:
   a. short circuit losses in connections between the cells;
   b. transport losses (coion transport, natural osmosis, salt diffusion in a reverse direction);
   c. transport losses due to transfer $H^+$ and $OH^-$ ions resulting from water dissociation.

In actual plants current efficiency is higher than 90 percent.

2. As experimentally shown, two-thirds of the unit resistance is due to concentration and ohmic polarizations.

Concentration polarization is due to the different transport number for ions in the solution and in the ion-exchange membrane, causing ion packing up on one of the said ion-exchange membranes and depletion on the other side of said ion-exchange membrane. On ion passage, the diffusion type of resistance increases as the concentration gradient increases and, therefore, the higher the current density the greater the difference between transport numbers in solution and ion-exchange membrane.

Additionally, concentration polarization can provide a further increase in resistance owing to high concentrations of some ions in the film, in this case resulting in insoluble salts being precipitated and a formation, of thin gaseous layers adhering to the ion-exchange membranes, such salts and thin gaseous layers having an extremely high type of localized resistance, which is referred to as resistance of ohmic polarization.

Such undeserved phenomena are enhanced by local overheatings due to Joule effect as a result of precipitation formations and to some extent can be reduced either by increasing the turbulence in the solution contacting the ion-exchange membranes, or by acid introduction.

3. Plant capacity is directly bound to current density, the practical value of which is however kept at a fraction of about 80 percent of the limiting current density, this in order not to unduly enhance the previously set forth polarization phenomena.

Initially the current density will linearly increase as the potential differential applied to the electrodes increases; then, this current density will remain substantially constant even while considerably raising the applied voltage. This value is the above-mentioned limit value for the current density.

The present invention substantially comprises a pretreatment system for supply water in an electrodialysis plant, where said water has an alkaline content, which pretreatment changes the composition of the material dissolved therein, allowing:
- to reduce the resistances of concentration polarization and ohmic polarization;
- to avoid scale forming by salt deposit;
- to remove from supply water the materials of a colloidal character which would otherwise deposit on the diaphragms;
- to raise the density of actual current while, increasing the amount of product and decreasing the specific consumptions of energy and chemical reactants; and
- to use sulphuric acid also at high concentrations, instead of hydrochloric acid, thus enabling an additional economy.

The pretreatment according to the present invention consists of wholly or partially removing hardness and $HCO_3^-$ ions from supply water by passage through cation-exchange resins and subsequent degassing, or removing $HCO_3^-$ ions only by passage on anionic type of exchange resins, according to the following reactions:

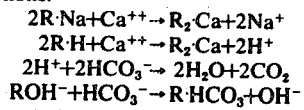

Depending upon the hardness/alkalinity ratio, the resins are reactivated either as R·Na at the expense of sodium salts in the salt concentrated drain solution from the electrodialysis plant, or as R·H at the expense of an amount of acid which is less than that heretofore used in the salt concentrate chambers of electrodialysis plants where supply water pretreatment according to the present invention is not employed.

Thus, for the latter:
1. it is required that the acid neutralize both the amount of $HCO_3^-$ being transferred from dilute to concentrate chamber and the amount of $HCO_3^-$ in the makeup raw water to the sale concentrate waste stream;
2. the amount of acid to be added is larger than the stoichiometric amount in order to provide on the concentrated stream side a sufficiently high concentration of $H^{++}$, so that it may diffuse to the anionic ion-exchange membranes.

In the pretreating process according to the present invention, the supply water is divided into two streams A and B: stream A is supplied on hydrogen-reactivated resin and the cations in the stream are exchanged for hydrogen ions; stream B is supplied on sodium-reactivated resin and softened; the ratios of flows A and B are such that when admixed the full removal of $HCO_3^-$ ion is attained in accordance with the reaction:

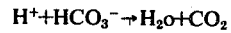

Makeup water to the salt concentrate stream is never processed. By the passage on the cationic resin, a partial demineralization of supply water is obtained through removal of $HCO_3^-$ ions and $Ca^{++}$ and $Mg^{+++}$ ions bonded thereto, thus relieving the load on the electrodialysis unit.

With the removal of bicarbonates and subsequent replacement of a portion of the calcium and magnesium by $Na^+$ ions, because of the following reasons a substantial reduction for the unit resistance is obtained:
   a. $Na^+$ ions exhibit in the solution a higher mobility than $Ca^{++}$ ions and a higher transport number in the ion-exchange membranes;
   b. the removal of $HCO_3^-$ ions reduces the concentration polarization on the anionic ion-exchange membranes; and
   c. as a result of the combined effect of the whole or partial removal of $HCO_3^-$ ions and hardness, the chance for scale forming by reaction with $Ca^{++}$ on said ion-exchange membranes on the concentrated stream side is avoided.

The low total transport number (i.e., the fraction of the total current carried by an ionic species) for $HCO_3^-$ ions, as compared with that for the other anions, is shown by the following experimental results, related to in the table, in which the first line indicates the desalting factor and the second line indicates the corresponding values for the percent ratio between the amount of $HCO_3^-$ ions and total anions in the product:

| 0,0 | 0,287 | 0,584 | 0,719 | 0,877 |
|-----|-------|-------|-------|-------|
| 18,0 | 22,1 | 26,5 | 33 | 37,7 |

By way of nonrestrictive indication, the result is given for an experiment accomplished on a 10,000 g.p.d. electrodialysis plant, wherein the plant was firstly supplied with brackish water, as such, from the subsoil and then with water as processed according to the improved process of the present invention.

| Supply, type | Total incoming anions | Total outgoing anions | Flowrate m.³/h. | Specific consump. | Acid consump. |
|---|---|---|---|---|---|

|  |  |  | KWh./m.³ | gr./m.³ |  |
|---|---|---|---|---|---|
| Water as such | 53,0 | 7,50 | 1.55 | 2.11 | 470 |
| Processed water | 44.5 | 7.50 | 2.15 | 1.53 | 345 |

Additionally, the pretreatment according to the present invention allows one to utilize substantially higher current densities with a resulting larger production of water and lower consumption of energy: this because of the above resistance reduction and resulting reduction in the applied voltage.

What I claim is:

1. In the process of treating water by electrodialysis whereby membrane fouling is substantially prevented, the improvement comprising: dividing said water into a first and second feed stream, passing said first stream through a hydrogen-form cation exchanger whereby the cation impurities of said water are exchanged for hydrogen ions, passing said second stream through a sodium-form cation exchanger whereby the cation impurities of said water are exchanged for sodium ions, combining portions of the effluent streams from both of said exchangers in a ratio whereby at least a stoichiometric amount of acid is available in said first stream effluent portion to react with and neutralize the bicarbonate ions present in said second stream effluent portion, desalinating said combined stream by passing into the salt-diluting compartments of said electrodialysis cell whereby there is formed a dilute salt product stream and a concentrated salt waste stream respectively.

2. The process of claim 1 wherein the combined water stream is degassified prior to passage of said stream into the electrodialysis cell.

3. The process of claim 1 wherein there is passed at least a portion of said salt waste stream into the exhausted sodium form cation exchanger to thereby at least partially regenerate said exchanger.

4. The process of claim 1 wherein an acid is passed into the exhausted hydrogen-form cation exchanger to thereby at least partially regenerate said exchanger.

5. The process of claim 4 wherein the acid employed is sulfuric acid.

* * * * *